(12) United States Patent
Hamilton (10) Patent No.: US 11,229,157 B2
(45) Date of Patent: Jan. 25, 2022

(54) INDEPENDENT PLANTER CLOSING SYSTEM

(71) Applicant: AGCO Corporation, Duluth, GA (US)

(72) Inventor: Kevin J. Hamilton, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 118 days.

(21) Appl. No.: 16/346,309

(22) PCT Filed: Oct. 4, 2017

(86) PCT No.: PCT/IB2017/001202
§ 371 (c)(1),
(2) Date: Apr. 30, 2019

(87) PCT Pub. No.: WO2018/083525
PCT Pub. Date: May 11, 2018

(65) Prior Publication Data
US 2019/0297774 A1 Oct. 3, 2019

Related U.S. Application Data

(60) Provisional application No. 62/416,785, filed on Nov. 3, 2016.

(51) Int. Cl.
*A01C 7/20* (2006.01)
*A01B 63/00* (2006.01)
*A01B 63/32* (2006.01)
*A01C 5/06* (2006.01)

(52) U.S. Cl.
CPC ............ *A01C 7/205* (2013.01); *A01B 63/002* (2013.01); *A01B 63/32* (2013.01); *A01C 5/068* (2013.01)

(58) Field of Classification Search
CPC ....... A01B 63/002; A01B 63/32; A01C 5/066; A01C 5/068; A01C 7/205
See application file for complete search history.

(56) References Cited

U.S. PATENT DOCUMENTS

| | | | | |
|---|---|---|---|---|
| 3,227,226 A | * | 1/1966 | Bayne | A01C 5/066 172/705 |
| 4,404,918 A | * | 9/1983 | Whalen | A01C 5/068 111/137 |
| 5,623,997 A | * | 4/1997 | Rawson | A01B 35/18 172/156 |
| 8,910,582 B2 | | 12/2014 | Mariman et al. | |

(Continued)

OTHER PUBLICATIONS

GB Intellectual Property Office, Search Report for related GB Application No. GB1620878.7, dated Jun. 7, 2017.

(Continued)

*Primary Examiner* — Thomas B Will
*Assistant Examiner* — Ian A Normile (57) ABSTRACT

In one embodiment, a row unit, comprising an upright frame portion comprising front and rear-facing sides, the front facing side configured to be coupled to a tool bar; a fore and aft extending frame coupled on one end to the rear-facing side, the fore and aft extending frame operably coupled to one or more disc openers and plural gauge wheels; a pair of arms pivotably and independently coupled to the fore and aft extending frame; a pair of closing wheels, each operably coupled to one of the pair of arms; and a pair of down force components, each coupled between the upright frame and the one of the pair of arms.

21 Claims, 5 Drawing Sheets

(56) References Cited

U.S. PATENT DOCUMENTS

| | | |
|---|---|---|
| 9,032,886 B2 | 5/2015 | Anderson et al. |
| 2008/0023207 A1 | 1/2008 | Lung et al. |
| 2008/0184920 A1 | 8/2008 | Thompson et al. |
| 2009/0025619 A1* | 1/2009 | Vandersnick .......... A01C 7/205 111/135 |
| 2012/0210920 A1 | 8/2012 | Bassett |
| 2012/0255475 A1* | 10/2012 | Mariman ............... A01C 7/205 111/149 |
| 2013/0206431 A1 | 8/2013 | Freed |
| 2013/0263767 A1 | 10/2013 | Trevino et al. |
| 2014/0066650 A1 | 3/2014 | Aslam et al. |
| 2014/0190374 A1 | 7/2014 | Anderson et al. |
| 2014/0190382 A1* | 7/2014 | Anderson .............. A01C 5/066 111/193 |
| 2014/0224513 A1 | 8/2014 | Van Buskirk et al. |
| 2015/0096481 A1* | 4/2015 | Glendenning ......... A01B 49/06 111/120 |
| 2015/0107862 A1 | 4/2015 | Freed |
| 2015/0271986 A1* | 10/2015 | Sauder ................. A01B 49/027 172/2 |
| 2016/0037709 A1* | 2/2016 | Sauder .................. A01C 5/062 700/275 |
| 2016/0088790 A1 | 3/2016 | Anderson |

OTHER PUBLICATIONS

European Patent Office, International Search Report for International Application No. PCT/IB2017/001202, dated Jan. 4, 2018.
Techopedia, "Definition of ACTUATOR", published @https://www.techopedia.com/definition/17043/actuator, accessed and printed on Feb. 25, 2021.

\* cited by examiner

INDEPENDENT PLANTER CLOSING SYSTEM

CROSS REFERENCE TO RELATED APPLICATION

This application claims the benefit of U.S. Provisional Application No. 62/416,785 filed Nov. 3, 2016, which is hereby incorporated by reference in its entirety.

TECHNICAL FIELD

The present disclosure is generally related to agricultural equipment, and more particularly, agricultural equipment for seeding.

BACKGROUND

Traditional planter closing systems use a pair of angled wheels mounted on a single casting with either a mechanical spring or an air bag providing down force. This system has worked well for a long period of time, but performance may suffer when one of the wheels encounters field debris. For instance, seed-to-soil contact may be impacted because neither closing wheel is adequately engaged with the soil due to the encounter with the field debris or other terrain features.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DESCRIPTION OF EXAMPLE EMBODIMENTS

Overview

In one embodiment, a row unit, comprising an upright frame portion comprising front and rear-facing sides, the front facing side configured to be coupled to a tool bar; a fore and aft extending frame coupled on one end to the rear-facing side, the fore and aft extending frame operably coupled to one or more disc openers and plural gauge wheels; a pair of arms pivotably and independently coupled to the fore and aft extending frame; a pair of closing wheels, each operably coupled to one of the pair of arms; and a pair of down force components, each coupled between the upright frame and the one of the pair of arms.

DETAILED DESCRIPTION

Certain embodiments of an independent planter closing system and method are disclosed that involve independent operation and down force control of a pair of closing wheels of one or more row units to ensure proper seed-to-soil contact. In one embodiment, an independent planter closing system comprises two independent closing wheels, closing wheel arms, pivots, and down force components. For instance, the closing wheel arms may be mounted on row unit frame mounts similar to existing gauge wheel arm mounts so that placement laterally on the row may be quickly adjusted. Down force components may include down force cylinders (e.g., hydraulic, pneumatic, or electrically actuated) that may be connected to the closing wheel arms and to the row unit frame to control the force on the closing wheels. The closing wheel arms are coupled to the closing wheels, which may close either or both sides of the seed trench. Control may be via passive or active control. In one embodiment, input may be based on a manual input (e.g., via an operator user interface in the cab or elsewhere), a sensor input (e.g., from a real-time sensor system), or from a prescribed depth map. For instance, the down force may be adjusted via feedback control to increase or decrease the depth of the closing wheels into the soil to maintain a constant or substantially constant down force on each of the closing wheels.

Digressing briefly, conventional planter systems often use a pair of closing wheels that move in kind (e.g., have a common linkage), which when field debris is encountered by one of the closing wheels, the positioning of both closing wheels are affected (as are the forces on the closing wheels). In other words, based on the encounter by one of the wheels, both wheels may be re-positioned at a depth that negatively impacts the till and compaction actions (e.g., where the closing wheels provide both functions), possibly resulting in lower crop yields. In some conventional planter systems, each closing wheel is separately biased, but generally achieved at the expense of a complicated and crowded structural framework. In contrast, certain embodiments of independent planter closing systems use a straightforward, space-efficient structural approach to enabling independent control of the closing wheels, providing both a stable (e.g., constant or substantially constant) closing pressure range, regardless of encounters with debris at either of the closing wheels, and freed-up space for enabling different types of metering solutions.

Having summarized certain features of an independent planter closing system of the present disclosure, reference will now be made in detail to the description of the independent planter closing system as illustrated in the drawings. While the independent planter closing system is described in connection with these drawings, there is no intent to limit the independent planter closing system to the embodiment or embodiments disclosed herein. For instance, though described herein according to closing wheels of an angled and staggered design that performs both functions of till and press, certain features may be applicable to and beneficially deployed in row units that have closing wheels and a press wheel. Further, although the description identifies or describes specifics of one or more embodiments, such specifics are not necessarily part of every embodiment, nor are all various stated advantages necessarily associated with a single embodiment or all embodiments. On the contrary, the intent is to cover all alternatives, modifications and equivalents included within the spirit and scope of the disclosure as defined by the appended claims. Further, it should be appreciated in the context of the present disclosure that the claims are not necessarily limited to the particular embodiments set out in the description.

It is noted that reference herein to left and right and front and rear is from the perspective of an operator navigating a tractor or other towing vehicle that tows a planter in a forward direction. Also, reference to down force refers to the force that is applied to one or more closing wheels by one or more down force components (e.g., air bag, hydraulic, pneumatic, electric actuators/cylinders, torsional springs, etc.), including to overcome a resistance (e.g., the soil provides a resistance to the penetration of the soil by the closing wheels).

Figure 1:
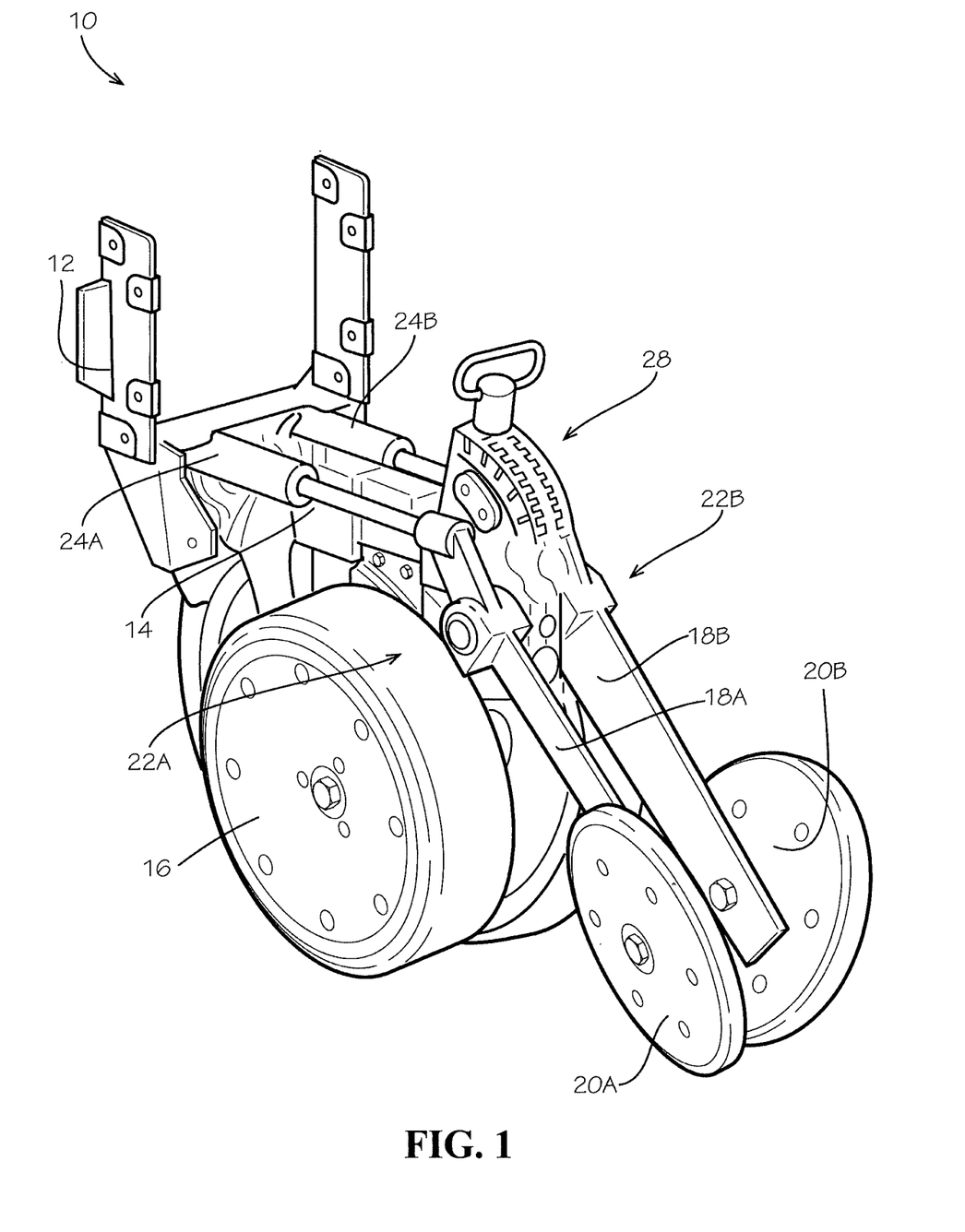
FIG. 1 is a schematic diagram that illustrates, in left rear, fragmentary perspective view, an embodiment of an independent planter closing system.
Figure 2:
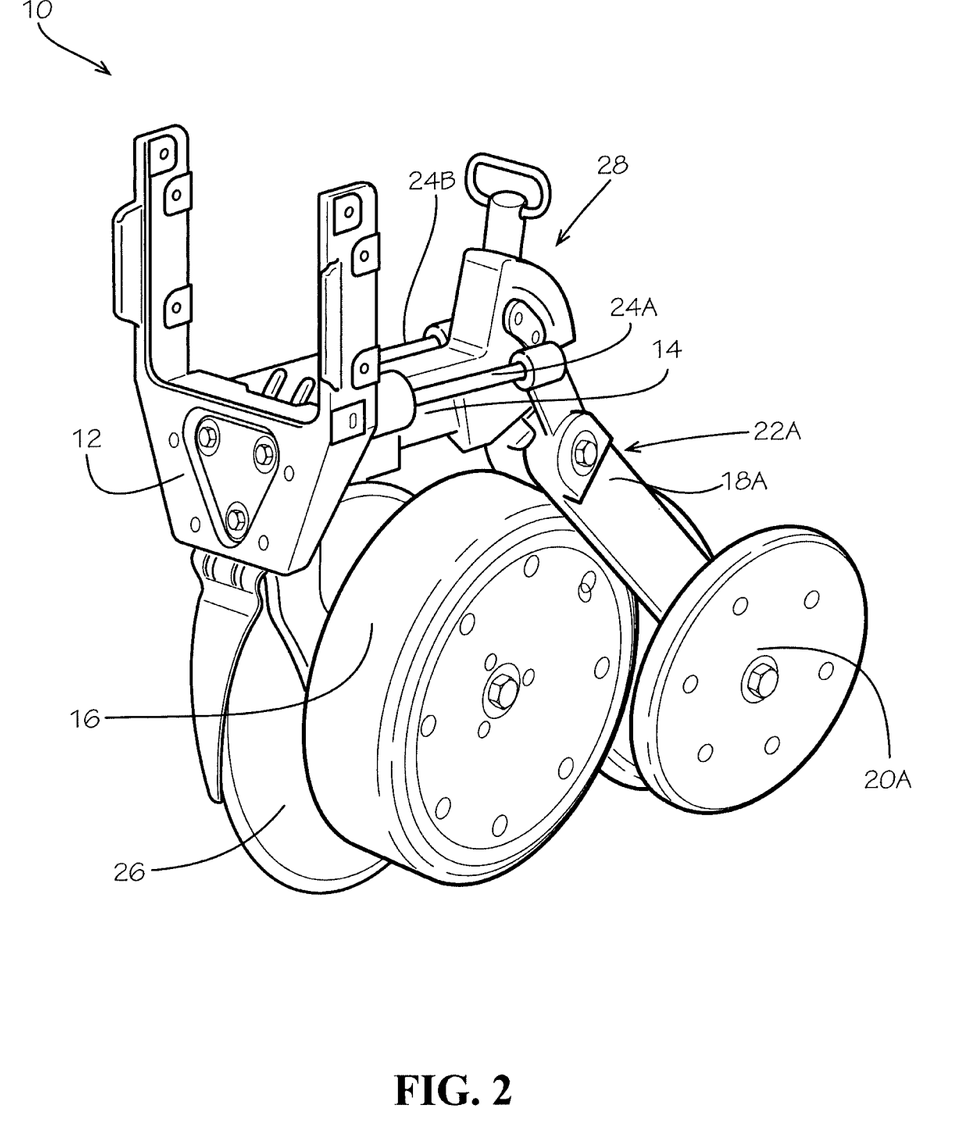
FIG. 2 is a schematic diagram that illustrates, in left front, fragmentary perspective view, an embodiment of an independent planter closing system.
Figure 3:
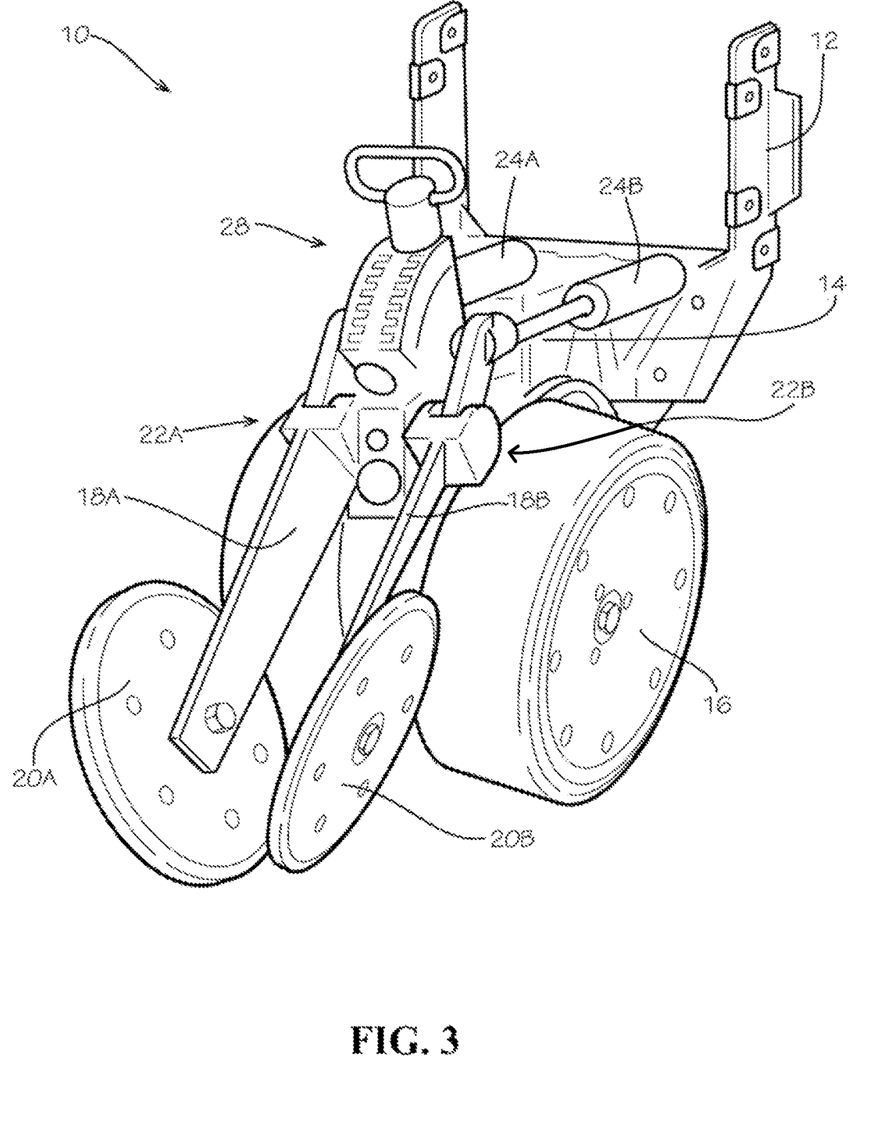
FIG. 3 is a schematic diagram that illustrates, in right rear, fragmentary perspective view, an embodiment of an independent planter closing system.

FIGS. 1-3 show various fragmentary perspective views of an example independent planter closing system embodied as a row unit 10. However, in some embodiments, an independent planter closing system may comprise additional or fewer components. For instance, one embodiment of an independent planter closing system may include a control system and the structural features of the row unit depicted in FIGS. 1-3, or some embodiments may include multiple row units of the design embodied in FIGS. 1-3 coupled (via a tool bar) along a transverse implement, with or without a control system. It should be appreciated by one having ordinary skill in the art that the row unit 10, along with other row units, is typically coupled via a parallel linkage to a transverse tool bar that is coupled to a frame (e.g., draw bar) that further comprises or is coupled to a tongue that couples to a towing vehicle (e.g., tractor) via a hitch assembly. As these components are known, discussion of the same is omitted here for brevity. Referring to FIGS. 1-3, shown is the row unit 10 comprising, from fore to aft, an upright frame portion 12 (having a front-facing side that is coupled to a parallel linkage that couples the row unit 10 to a tool bar, and a rear-facing side), a fore and aft extending frame 14 connected to the upright frame portion 12 (e.g., connected to the rear-facing side of the upright frame portion 12), a pair of gauge wheels 16, a pair of closing wheel arms 18 (e.g., 18A, 18B), and a pair of closing wheels 20 (e.g., 20A, 20B) operably coupled respectively to the pair of closing wheel arms 18. In one embodiment, the upright frame 12 is orthogonal to the fore and aft extending frame 14. The pair of closing wheel arms 18 (or simply, arms) are pivotably coupled to the fore and aft extending frame 14 at pivots 22 (e.g., 22A, 22B), which are each mounted to the fore and aft extending frame 14 and each correspond to a pivot axis running transversely to a longitudinal axis (fore and aft) of the fore and aft extending frame 14. In one embodiment, each closing wheel arm 18 is mounted on a hub having a threaded inner diameter that mounts to a threaded shaft. The threaded shaft comprises a pin that is inserted transversely to and through the fore and aft extending frame 14. Each of the arms 18 slides on to the hub, enabling a freely pivoting motion. The aforementioned assembly arrangement also enables easy lateral adjustment of the components. The assembly is retained with a retaining mechanism (e.g., a bolt that threads into a bore on the center of the threaded shaft and a washer, though other retention mechanisms may be used), providing retention via a clamp load against the arms 18. It should be appreciated by one having ordinary skill in the art that other mechanical arrangements may be used in some embodiments to secure the pair of closing arms 18 to the fore and aft extending frame 14. Each closing wheel arm 18A and 18B is independently pivotable about the pivot axis, enabling a stable down force to be applied on one closing wheel 20 despite an encounter of field debris or other field features by the other closing wheel 20, ensuring a constant or substantially constant closing wheel down force to enable proper till and pressing of the soil and in general, proper seed-to-soil contact. The row unit 10 also comprises a pair of gauge wheels 16. In one embodiment, each of the gauge wheels 16 may be coupled to a respective one of a pair of arms that are respectively coupled at the pivots 22, which enables the gauge wheels 16 to be operably coupled to the fore and aft extending frame 14. In some embodiments, the pivot for the gauge wheel arm connections may be located at the front side of the row unit. For instance, the pair of gauge wheel arms may be coupled (e.g., bolted) to the upright frame 12, operably coupling the gauge wheels 16 via connection of the upright frame 12 to the fore and aft extending frame 14. In some embodiments, the pair of gauge wheel arms may be coupled to the fore and aft extending frame in other locations, such as to a position lower and to the rear of the fore and aft extending frame 14.

Returning back to the description of the arms 18, the pair of closing wheel arms 18 are positioned beneath the pivots 22 in one embodiment at an obtuse angle relative to the longitudinal axis of the fore and aft extending frame 14. Stated otherwise, the pair of closing wheel arms 18 extend rearwardly and downwardly from the pivots 22, enabling the closing wheels 20 to trail behind the gauge wheels 16. In one embodiment, the closing wheels 20 are staggered for and aft and angled in a manner to provide both a till and pressing function (e.g., to close a trench in which seed is placed), though in some embodiments, the closing wheels may be oriented relative to each other in a non-staggered formation and of a different angle than that shown (e.g., different angle of entry/penetration into the soil).

The pair of closing wheel arms 18 also extends above the pivots 22, and in one embodiment, at an offset (e.g., upwards, such as closing an angle between the portion of the arm above and below the pivots 22) angle relative to the portion of the pair of closing wheel arms 18 located beneath the pivots 22. Coupled to each end of the pair of closing wheel arms 18 located above the pivots 22 are a pair of down force components 24 (e.g., 24A, 24B). The down force components 24A and 24B are each independently coupled to the respective closing wheel arms 18A and 18B, enabling independent control (e.g., adjustment of position). The opposing end of each of the down force components 24 is respectively coupled to the upright frame portion 12 (the rear-facing side). In one embodiment, the down force components 24 may be actuators embodied as cylinders, of a rod and piston type as depicted in FIGS. 1-3, or rotary in some embodiments, including hydraulic actuators, pneumatic actuators, or electric actuators. In some embodiments, the down force components 24 may be springs (e.g., torsional or coil springs). Omitted from FIGS. 1-3 are some of the conventional components used for the transfer and/or control of the fluid medium that enables control of the down force components, including conduits (e.g., hoses, wiring, etc.) for the transfer of the fluid medium (e.g., oil, air, electric), and control components (e.g., one or more control (e.g., air or hydraulic) valves, switches, motors, solenoids, etc.) regulating the flow of the corresponding fluid medium to and from the down force components to maintain a constant or substantially constant closing wheel down force pressure. The down force components 24 are independently controllable to ensure a stable pressure applied to the soil by the respective closing wheels 20 through the positioning (e.g., extension and retraction) of the closing wheel arms 18.

In the depicted embodiment, the down force components 24 are oriented in parallel with the longitudinal axis of the fore and aft extending frame 14, though in some embodiments, may be slightly offset (e.g., within a few degrees) according to an angle of trajectory fore and aft relative to the longitudinal axis of the fore and aft extending frame 14.

Disposed adjacent to, and on the inside-side of each of the gauge wheels 16, are one or more disc openers 26 (e.g., the left disc opener best shown in FIG. 2), which, as is known, perform the function of penetrating the soil to create a furrow or trench for seed placement. Also shown is a gauge wheel adjustment linkage or assembly 28, which as is known, affords an operator the ability to manually adjust the gauge wheel positioning (and hence down force adjustment of the gauge wheels 16).

Although some of the components are shown as separate structural attachments (e.g., upright frame portion 12 secured to the fore and aft extending frame 14 via bolts, welds, etc.), in some embodiments, two or more components may be combined as a cast or machined component.

Figure 4A:
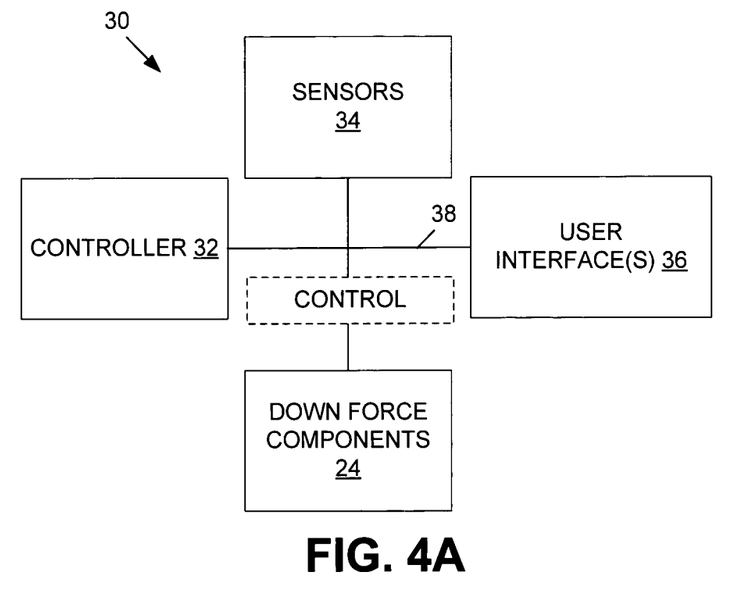
FIG. 4A is a block diagram that illustrates an embodiment of an example control system for an independent planter closing system.

Having described an example structural framework for an embodiment of an independent planter closing system, attention is directed to FIG. 4A, which illustrates an embodiment of an example control system 30 for the independent planter closing system. One having ordinary skill in the art should appreciate in the context of the present disclosure that the example control system 30 is merely illustrative, and that some embodiments of control systems may comprise fewer or additional components, and/or some of the functionality associated with the various components depicted in FIG. 4A may be combined, or further distributed among additional components, in some embodiments. For instance, in one embodiment, the control system 30 is distributed among the row unit 10 (or in some embodiments, a planter comprising a plurality of row units dissimilarly structured as row unit 10) and the towing vehicle. In some embodiments, the control system 30 is hosted entirely by the row unit 10 (or a planter comprising a plurality of row units each similarly structured as row unit 10). In some embodiments, the control system 30 is distributed among the row unit (or planter) and a remote computing device (e.g., in communication with components of the control system 30 via telemetry or radio frequency communications), and in some embodiments, the control system 30 is distributed among the towing vehicle, the row unit 10 (or planter), and a remote computing device. For purposes of brevity, attention is focused on an embodiment where the control system 30 is distributed among the row unit 10 and a towing vehicle, with the understanding that other configurations, including those mentioned above, may be used in some embodiments.

The control system 30 comprises one or more controllers, such as controller 32, one or more sensors 34, user interfaces 36, and the down force components 24, all coupled over a network 38, such as a controller area network (CAN), though not limited to a CAN network or a single network. In one embodiment, the network 38 may comprise a wired network (e.g., twisted pair, copper, etc.), a wireless network (e.g., based on IEEE 802.11, Bluetooth, Near Field Communications (NFC), etc.), or a combination of wired and wireless networks. The controller 32 is depicted as a single controller, but in some embodiments, plural controllers may be used in peer-to-peer or master/slave arrangements to effect operations of certain embodiments of an independent planter closing system. The controller 32 is explained further below.

The sensors 34 may include soil moisture and/or soil content sensors that operate based on wireless technology (e.g., reflected microwaves that indicate moisture content based on reflected microwave radiation, an optical spectrometer to determine constituent elements in the soil, etc.). The sensors 34 may include contact-type sensors suspended from the row unit 10 or the towing vehicle that sample the soil and detect soil moisture directly. The sensors 34 may further include weather sensors, such as humidity, barometric, and/or wind sensors. The sensors 34 may also include a global navigation satellite systems (GNSS) receiver that enables the controller 32 to compare the current field location with a field and/or depth map that provides (e.g., based on ground sensors, soil analysis, etc.) contemporaneous measures of soil moisture and/or content and determine depth requirements based on matched GNSS receiver locations with locations in the field and/or depth map. For instance, the field and/or depth map may be associated with hardness of the soil, bulk density, soil series type, residue level, among other measures. The sensors 34 may include soil resistance sensors (e.g., load cells) that determine the resistance of the soil to the closing wheel down force. In some embodiments, the sensors 34 may include a pressure sensor integral to, or otherwise attached to, each of the down force components 24, such as to enable independent feedback in real time of the down force pressure corresponding to the closing wheels 20 (FIG. 1) and appropriate independent down force adjustment. For instance, the sensors 34 may sense hydraulic pressure or air pressure, depending on the technology of, and/or fluid medium used in, the downforce components 24. In some embodiments, positional changes in the rod and/or piston travel of the down force components 24 may be used. In some embodiments, the sensors 34 may include a load cell coupled to each closing wheel 20, to the respective closing wheel arms 18, and/or to the down force components 24 (e.g., when embodied as springs) again enabling independent control of the down force adjustment to the closing wheels 20. In some embodiments, the sensors 34 may comprise all of or any combination of these types of sensors, or a subset of them in some embodiments.

The user interfaces 36 may include an FNR handle, a keyboard/pad and/or mouse, a display device (e.g., toughtype display, liquid crystal diode (LCD), plasma-based, etc.), and/or other input and output devices (e.g., a microphone for audible input in some embodiments, speakers for audible output, haptic devices for feedback, etc.). In other words, the user interfaces 36 may enable control and/or feedback of current down force measurements and/or adjustments, the feedback provided visually, audibly, and/or according to tactile methods. For instance, when comprising a display device, the user interfaces 36 may signal to or generally alert the operator in the towing vehicle (e.g., at an operator console) that there is a need for a change in depth and further provide controls (e.g., on the screen or associated with the screen, such as a keypad or keyboard) to effect the depth adjustment. In some embodiments, the display device may present feedback of an automatic depth adjustment, merely providing an alert to the operator that the depth adjustment has taken place. In some embodiments, the depth adjustment requirement may be presented to the operator, with the operator merely accepting the impending change or denying the change. In some embodiments, manual adjustment of the closing wheel down force setting (e.g., at which the control system 30 attempts to maintain each closing wheel down force) may be implemented via a displayed setting icon (e.g., adjusted on the screen, such as presented as a dial or knob icon or arrow or scroll mechanism) or visually represented yet adjusted via controls in the cab (e.g., not on a display screen) of the towing vehicle or elsewhere (e.g., on the planter). These and/or other mechanisms of operator control of depth adjustment and/or closing wheel down force settings may be used, and hence are contemplated to be within the scope of the disclosure.

In one embodiment, the down force components 24, as indicated above, comprise a control portion (e.g., solenoid, motor, actuable valve(s), etc.) and a cylinder body, which may include a linear actuator having a rod and piston type design, though it should be appreciated by one having ordinary skill in the art that rotary style designs and/or other types of actuators may be used in some embodiments. The control portion is indicated in FIG. 4A with a dashed box labeled, "control". The control and the down force components 24 may be part of a hydraulic or pneumatic circuit that also includes a source or reservoir (not shown), such as a hydraulic pump and reservoir (for hydraulic systems) or an air compressor (pneumatic systems). For instance, in the case of a hydraulic cylinder, the control portion may be embodied as a single hydraulic valve (e.g., controlled electronically at an actuator to adjust a spool or poppet to independently regulate the flow of the hydraulic fluid), enabling independent control of flow into or out of the ports of each of the hydraulic cylinders, or multiple (e.g., two) hydraulic, electronically actuated valves that receive electronic control signals at their respective actuators to adjust a spool or poppet to independently regulate the flow of the hydraulic fluid into and out of the ports of each of the hydraulic cylinders. Other control arrangements using the valves with switches and/or other control elements known in the art may be used to perform the same purpose of independently regulating the flow into and out of the hydraulic cylinders to maintain a constant or substantially constant closing wheel down force. In some embodiments, including when pneumatics technology is used, one or more air valves (e.g., electrically actuated) may be used. In some embodiments, the valves may be omitted, and electronic or electrical cylinders (e.g., linear or rotary) or electromagnetic cylinders may be used. Note that, though described using electrical actuation, in some embodiments, hydraulic or pneumatic control signals may be used to adjust the spool or poppet. In general, the down force components 24 may comprise pneumatic, hydraulic, or electric technology. In some embodiments, the down force components 24 may comprise springs, using passive control or under active control by a motor. The controller 30 communicates with the down force components 24 directly or indirectly (via intermediate devices) via the control portion of the down force components 24.

Figure 4B:
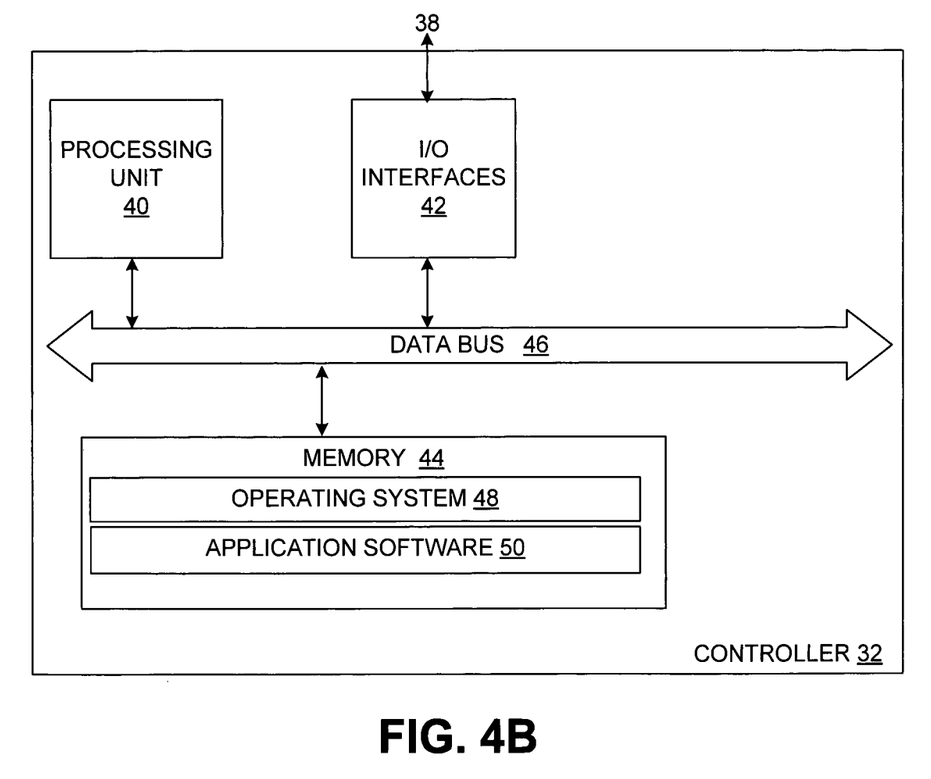
FIG. 4B is a block diagram that illustrates an embodiment of an example controller for the control system of FIG. 4A.

Referring to FIG. 4B, shown is an embodiment of the example controller 32, which comprises a computer architecture. It should be appreciated by one having ordinary skill in the art that the controller 32 depicted in FIG. 4B is one example illustration, and that in some embodiments, fewer, greater, and/or different components may be used. Also, it should be appreciated by one having ordinary skill in the art that certain well-known components of computer systems are omitted here to avoid obfuscating relevant features of the controller 32. In one embodiment, the controller 32 comprises one or more processing units 40, input/output (I/O) interface(s) 42, and memory 44, all coupled to one or more data busses, such as data bus 46. The memory 44 may include any one or a combination of volatile memory elements (e.g., random-access memory RAM, such as DRAM, SRAM, and SDRAM, etc.) and nonvolatile memory elements (e.g., ROM, Flash, solid state, EPROM, EEPROM, hard drive, CDROM, etc.). The memory 44 may store a native operating system, one or more native applications, emulation systems, or emulated applications for any of a variety of operating systems and/or emulated hardware platforms, emulated operating systems, etc. In the embodiment depicted in FIG. 4B, the memory 44 comprises an operating system 48 and application software 50.

The application software 50 comprises functionality for enabling operator or user interaction with the independent planter closing system (e.g., graphical user interfaces (GUI), and may store information (e.g., in memory 44 or other storage devices) useful to determining down force settings, including a depth map, soil resistances, soil types, previous settings, etc. For instance, the application software 50 may maintain a data structure (e.g., look-up table) that associates current sensor readings for one or more parameters (e.g., pressure, load sense, etc.) with an appropriate down force adjustment. It should be appreciated that in some embodiments, additional or fewer software modules (e.g., combined functionality) may be employed in the memory 44 or additional memory. In some embodiments, a separate storage device may be coupled to the data bus 46 or coupled via the I/O interfaces 42, such as a persistent memory (e.g., optical, magnetic, and/or semiconductor memory and associated drives).

The application software 50 may receive a closing wheel down force setting via the user interfaces 46 (FIG. 4A) according to operator entry, and/or based on accessing from memory 44 prior stored values. For instance, the values for closing wheel down force settings may vary based on the field and/or other conditions. When the operator prompts (or is prompted automatically) the user interfaces 36 for a settings menu (e.g., presented on a display screen), historical settings for various fields may be accessed from memory 44 (or a remote memory, such as accessed using a cellular modem in the towing vehicle) and presented to the operator for selection. In some embodiments, the operator may enter parameters for various conditions, such as soil hardness, moisture, etc., and the application software 50 determines based on those entered parameters the appropriate down force setting. In some embodiments, the down force settings may be established based on receiving signals from the sensors 34, where the operator may merely be presented with a recommended setting for selection, or the settings may automatically determined from a prescribed depth map accessed according to operator entry at the user interfaces 36 or prompted based on sensor input (e.g., location signals, such as from a connected position device, including Global Navigation Satellite Systems (GNSS) receiver signals) that enables a determination of which field the planting system is located. In embodiments that use a spring for the down force components 24, the settings may be manually adjusted via a pin or nut to change the spring length.

Once the closing wheel down force settings are established, the controller individually causes the down force components (e.g., via signaling to a control or controls associated with each down force component 24) to actuate as needed to enable a constant or substantially constant down force at each of the closing wheels. For instance, as the row units are towed across a field, the application software 50 continually assesses whether an adjustment in the stroke of one or more of the down force components 24 is needed. For instance, if one of the closing wheels encounters debris, raising the affected closing wheel, the sensor 34 associated with that affected wheel detects the event (e.g., the spike in pressure (or load)) and signals to the application software 50 the sensed load or pressure changing event, which in turn causes the signaling to the control (e.g., a hydraulic valve controlling the down force component 24) to bleed out (e.g., to a reservoir) an appropriate volume of hydraulic fluid. The flow of the hydraulic fluid out of the hydraulic valve results in the stroking of the corresponding down force component 24 to ensure that the raising of the affected closing wheel maintains the same or substantially same closing wheel down force (e.g., the closing wheel down force setting). In contrast, in conventional systems, the raising of the closing wheel according to the encounter with the debris may result in an excessive amount of down force at the affected closing wheel, which may damage or wear down components or cause misalignment (or cause the other closing wheel to lose contact with the soil, resulting in improper soil cover/compaction). As another example, if one of the closing wheels loses contact with the ground (e.g., due to a dip or gully in the terrain, or because of an encounter with a terrace that lifts the closing wheel(s) off the ground when the row unit crests the terrace), the event (e.g., drop in pressure or load) is detected by the sensor 34 associated with the affected closing wheel, and the application software 50 is signaled by the sensor 34 (e.g., wired or wirelessly). The application software 50 causes signaling to the associated control (e.g., the actuator of the hydraulic valve) to cause more hydraulic fluid flow to the down force component 24, resulting in stroking of the down force component to maintain the down force at the closing wheel down force setting despite the encounter with the terrace or dip in the soil surface. Generally speaking, the application software 50 is continually monitoring the closing wheel pressure and/or load and responsively causing independent adjustment to the down force component(s) 24 to ensure that the down force at each closing wheel is maintained at or substantially at the down force setting previously established. GUI functionality of the application software 50 may provide an option for the operator or the controller 32 to monitor these compensatory adjustments at each of the down force components 24. For instance, closing wheel down force may be presented in real time. to the operator. Although the description above for operations of an embodiment of an independent planter closing system is described using a single row unit 10, it should be appreciated that there will typically be plural row units 10 with individualized control according to the application software 50, and thus reference to the singular control may be extended to like-individualized control for plural row units 10.

Execution of the application software 50 is implemented by the processing unit 40 under the auspices of the operating system 48. In some embodiments, the operating system 48 may be omitted and a more rudimentary manner of control implemented. The processing unit 40 may be embodied as a custom-made or commercially available processor, a central processing unit (CPU) or an auxiliary processor among several processors, a semiconductor based microprocessor (in the form of a microchip), a macroprocessor, one or more application specific integrated circuits (ASICs), a plurality of suitably configured digital logic gates, and/or other well-known electrical configurations comprising discrete elements both individually and in various combinations to coordinate the overall operation of the controller 32.

The I/O interfaces 42 provide one or more interfaces to the network 38, as well as interfaces to one or more user interfaces or other devices. For instance, the I/O interfaces 42 receive wired or wireless signals from the sensors 34 and/or the user interface 36, and provide control signals to the down force components 24. The I/O interfaces 42 may also be coupled to one or more user interfaces to enable control of navigation and/or other machine functions.

Note that the controller 32 and/or the control system 30 may comprise additional functionality, such as a cellular modem and browser software for accessing devices communicating with a wide area network (e.g., the Internet) and/or radio frequency modem for communications with devices located external to the row unit 10, corresponding planter, and/or the towing vehicle, as well as machine control software for enabling planting control of the row unit or planter.

When certain embodiments of the controller 32 are implemented at least in part in logic configured as software/firmware, as depicted in FIG. 4B, it should be noted that the logic can be stored on a variety of non-transitory computer-readable medium for use by, or in connection with, a variety of computer-related systems or methods. In the context of this document, a computer-readable medium may comprise an electronic, magnetic, optical, or other physical device or apparatus that may contain or store a computer program for use by or in connection with a computer-related system or method. The logic may be embedded in a variety of computer-readable mediums for use by, or in connection with, an instruction execution system, apparatus, or device, such as a computer-based system, processor-containing system, or other system that can fetch the instructions from the instruction execution system, apparatus, or device and execute the instructions.

When certain embodiment of the controller 32 are implemented at least in part in logic configured as hardware, such functionality may be implemented with any or a combination of the following technologies, which are all well-known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 5:
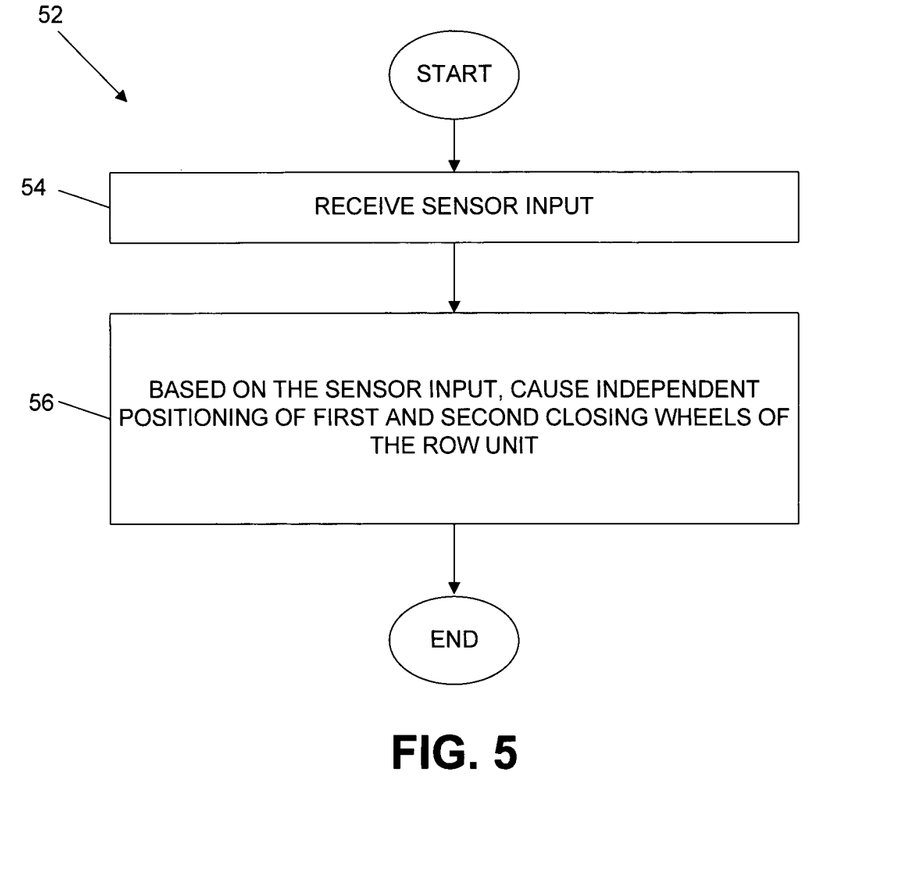
FIG. 5 is a flow diagram that illustrates an embodiment of an example independent planter closing method.

In view of the above description, it should be appreciated that one embodiment of a method for controlling positioning of closing wheels of a row unit, the method denoted in FIG. 5 as method 52, comprises receiving sensor input (54); and based on the sensor input, causing independent positioning of first and second closing wheels of the row unit (56). The input may be received at the controller 32 from the sensors 34 (pressure and/or load sensing), though in some embodiments, as indicated above, input may include operator input, field or depth map input, among other input. The causing may be as caused by signaling from the controller 32, or in some embodiments, based on peer-to-peer or master/slave communications between control components of down force components 24 with or without the controller 32.

Any process descriptions or blocks in flow diagrams should be understood as representing modules, segments, or portions of code which include one or more executable instructions for implementing specific logical functions or steps in the process, and alternate implementations are included within the scope of the embodiments in which functions may be executed out of order from that shown or discussed, including substantially concurrently or in reverse order, depending on the functionality involved, as would be understood by those reasonably skilled in the art of the present disclosure.

It should be emphasized that the above-described embodiments of the present invention are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and protected by the following claims.

The invention claimed is:

1. A row unit, comprising:
an upright frame portion comprising front- and rear-facing sides, the front-facing side configured to be coupled to a tool bar;
a fore-and-aft extending frame coupled on one end to the rear-facing side, the fore-and-aft extending frame operably coupled to at least one disc opener and at least one gauge wheel;
a first arm connected to the fore-and-aft extending frame at a first pivot axis;
a first closing wheel carried by the first arm;
a first down force actuator connected to the rear-facing side of the upright frame and to the first arm, the first down force actuator controllable to maintain a selected down force between the first closing wheel and a ground surface;
a second arm connected to the fore-and-aft extending frame at a second pivot axis;
a second closing wheel carried by the second arm; and
a second down force actuator connected to the rear-facing side of the upright frame and to the second arm, the second down force actuator controllable to maintain a selected down force between the second closing wheel and the ground surface.

2. The row unit of claim 1, wherein the upright frame is orthogonal to the fore-and-aft extending frame.

3. The row unit of claim 1, further comprising a parallel linkage, wherein the upright frame is coupled to the parallel linkage.

4. The row unit of claim 1, further comprising at least one gauge wheel arm connecting the at least one gauge wheel to the fore-and-aft extending frame.

5. The row unit of claim 1, wherein the fore-and-aft extending frame further comprises a gauge wheel adjustment linkage.

6. The row unit of claim 1, wherein the first and second arms each extend rearwardly from the fore-and-aft extending frame according to obtuse angles formed between the fore-and-aft extending frame and the first and second arms.

7. The row unit of claim 1, wherein the first and second down force actuators are oriented in parallel to a longitudinal axis of the fore-and-aft extending frame.

8. The row unit of claim 1, wherein the first and second down force actuators comprise pneumatic actuators.

9. The row unit of claim 1, wherein the first and second down force actuators comprise hydraulic actuators.

10. The row unit of claim 1, wherein the first and second down force actuators comprise electric actuators.

11. The row unit of claim 1, further comprising a first actuable valve coupled to the first down force actuator and a second actuable valve coupled to the second down force actuator.

12. The row unit of claim 1, wherein the first and second closing wheels are staggered fore and aft.

13. A closing wheel control system, comprising:
a row unit, comprising:
an upright frame portion comprising front- and rear-facing sides, the front-facing side configured to be coupled to a tool bar;
a fore-and-aft extending frame coupled on one end to the rear-facing side, the fore-and-aft extending frame operably coupled to at least one disc opener and at least one gauge wheel;
a first arm connected to the fore-and-aft extending frame at a first pivot axis;
a first closing wheel carried by the first arm;
a first down force actuator connected to the rear-facing side of the upright frame and to the first arm;
a second arm connected to the fore-and-aft extending frame at a second pivot axis;
a second closing wheel carried by the second arm; and
a second down force actuator connected to the rear-facing side of the upright frame and to the second arm; and
a controller configured to independently control actuation of the first and second down force actuators to maintain a selected down force between a ground surface and each of the first and second closing wheels.

14. The closing wheel control system of claim 13, further comprising one or more sensors, wherein the controller is configured to control the actuation of the first and second down force actuators based on input from the one or more sensors.

15. The closing wheel control system of claim 14, wherein at least one of the one or more sensors comprises a load cell or a pressure sensor.

16. The closing wheel control system of claim 14, wherein the first and second down force actuators comprise linear or rotary actuators.

17. The closing wheel control system of claim 13, further comprising a first actuable valve coupled to the first down force actuator and a second actuable valve coupled to the second down force actuator, wherein the first and second down force actuators comprise pneumatic or hydraulic actuators, and wherein the controller is configured to control actuation of the first and second down force actuators via the first and second actuable valves.

18. The closing wheel control system of claim 13, further comprising a user interface in communication with the controller.

19. The closing wheel control system of claim 13, wherein the controller is configured to control the actuation of the first and second down force actuators based at least in part on a prescribed depth map.

20. The closing wheel control system of claim 13, wherein the controller is configured to control the actuation of the first and second down force actuators via feedback control.

21. The closing wheel control system of claim 13, wherein the controller is configured to control the actuation of the first and second down force actuators based at least in part on manual input from an operator user input.

* * * * *